United States Patent
Moorhouse

(10) Patent No.: US 7,246,039 B2
(45) Date of Patent: Jul. 17, 2007

(54) FAULT DIAGNOSIS SYSTEM

(75) Inventor: Timothy James Moorhouse, Christchurch (GB)

(73) Assignee: Selex Communications Limited, Essex (GB)

(*) Notice: Subject to any disclaimer, the term of this patent is extended or adjusted under 35 U.S.C. 154(b) by 289 days.

(21) Appl. No.: 10/474,229

(22) PCT Filed: Jul. 15, 2003

(86) PCT No.: PCT/GB03/03057

§ 371 (c)(1),
(2), (4) Date: Oct. 3, 2003

(87) PCT Pub. No.: WO2004/010646

PCT Pub. Date: Jan. 29, 2004

(65) Prior Publication Data

US 2005/0114743 A1    May 26, 2005

(30) Foreign Application Priority Data

Jul. 19, 2002 (GB) ................................ 0216858.1

(51) Int. Cl.
*G06F 11/00* (2006.01)

(52) U.S. Cl. ........................................ 702/185; 706/56
(58) Field of Classification Search .................. 702/58, 702/59, 119, 179, 181, 182, 183, 184, 185, 702/196; 706/9, 21, 50–52, 56; 714/25, 714/26, 31, 48, 49
See application file for complete search history.

(56) References Cited

U.S. PATENT DOCUMENTS

| 5,465,321 | A | | 11/1995 | Smyth |
| 5,544,308 | A | | 8/1996 | Giordano et al. |
| 6,038,517 | A | * | 3/2000 | Dobbins et al. ............... 702/82 |

(Continued)

FOREIGN PATENT DOCUMENTS

DE          37 10 559 A       10/1988

(Continued)

OTHER PUBLICATIONS

Ray, Amit Kumar "Equipment Fault Diagnosis—A Neural Network Approach", Computers in Industry, Jun. 1991, pp. 169-177, No. 16, Amsterdam, NE.

(Continued)

*Primary Examiner*—John Barlow
*Assistant Examiner*—Mohamed Charioui
(74) *Attorney, Agent, or Firm*—Martin Fleit; Paul D. Bianco; Fleit Kain Gibbons Gutman Bongini & Bianco PL

(57) ABSTRACT

A fault diagnosis system for diagnosing faults in complex equipment. The system includes means for storing a set of diagnostic signatures which relates a set of known faults which may occur in the equipment to respective fault symptoms which are deemed indicative of said known faults; and means for processing the diagnostic signatures and a set of fault symptoms identified for a current state of the equipment to calculate diagnostic data for identifying a fault causing the current state of the equipment. The diagnostic data includes a plurality of values which are indicative of different relative non-zero likelihoods of each of a plurality of different known faults causing the current state of the equipment.

36 Claims, 5 Drawing Sheets

U.S. PATENT DOCUMENTS

| | | | |
|---|---|---|---|
| 6,041,182 A * | 3/2000 | Hart et al. | 706/50 |
| 6,076,083 A | 6/2000 | Baker | |
| 6,219,626 B1 | 4/2001 | Steinmetz et al. | |
| 6,249,755 B1 | 6/2001 | Yemini et al. | |
| 6,763,337 B1 * | 7/2004 | Verma et al. | 706/9 |
| 2001/0051938 A1 | 12/2001 | Hart et al. | |

FOREIGN PATENT DOCUMENTS

| | | |
|---|---|---|
| EP | 0 400 354 A | 12/1990 |
| EP | 0 504 457 A | 9/1992 |
| EP | 0 871 126 A2 | 10/1998 |
| JP | 62 6856 A | 1/1987 |

OTHER PUBLICATIONS

Sutter, Mark et al., "Designing Expert Systems for Real-Time Diagnosis of Self-Correcting Networks", IEEE Network, Sep. 1988, pp. 43-51, No. 5, New York, NY USA.

* cited by examiner

Fig. 5.

Diagnosis

Fault Diagnosis in Order of Probability

Fault(Main Tank Pressure Transducer PT4 Out of Range (Low)) Exact Match (Score 1) Probability 100.0%

User actions in Order of diagnostic Value

| User Action | Cost (mins) | Benefit | Value |
|---|---|---|---|
| Fix Fault(MainTank Pressure Transducer PT4 Out of Range (Low)) | | | |

| User Action | Normalisation | Diagnosis | Weighting |
|---|---|---|---|
| ○ Investigate Only | ⦿ Damage | ○ Normal | ⦿ 1 |
| ⦿ Investigate & Fix | ○ Wear & Tear | ⦿ Focussed | ○ 2 |

Estimate of Time (Minutes) to identify and fix fault
Optimistic: 10.0   Pessimistic: 30.0

Score Threshold (-1 to +1): 0.5
Probability Threshold (%): 1.0
User Action Threshold: 0.1

FAULT DIAGNOSIS SYSTEM

The invention relates to a fault diagnosis system. More specifically but not exclusively, the invention relates to a fault diagnosis system for use in the diagnosis of faults in complex equipment, such as satellite telecommunications networks.

Satellite telecommunications networks are complex equipment that include many parts, such as the satellite itself, the satellite base or ground station and the mobile transmitter/receivers that operate within the network. Such complex equipment can develop faults that require swift and efficient diagnosis and correction in order to return the network to operational state as soon as possible.

In such complex equipment, it may not be obvious what the fault is. The fault itself will generate a number of symptoms, and it is these symptoms that must be interpreted in order to trace and correct the fault. It should be noted that a single fault can produce a number of symptoms and that any one symptom can be generated by a number of faults.

Expert systems have been proposed as a possible method of diagnosing faults in complex equipment. An expert system requires experts to encode their expertise into machine readable code. This code can then be used to diagnose faults based on the symptoms presented by the equipment. One such expert system is described in U.S. Pat. No. 6,041,182.

However, the expert system approach requires there to be an expert for all the parts of the equipment, which for complex equipment will typically require a significant number of experts and very significant amounts of effort expended by each expert to encode their relevant expertise appropriately. Expert systems are rule based and the system would need to create rules based on the equipment in order to operate effectively. In complex equipment, these rules would be complex and their creation would be time consuming and involved. This would lead to an increase in the costs involved in setting up the expert system, both in terms of actual costs and increased time costs.

Another method of fault diagnosis that has been proposed is the use of a neural net. A neural net is a tool that is effectively trained. For the above example of a satellite telecommunication network the neural net would have to be trained and told what faults exhibited what symptoms. The time involved in creating a neural net for such a complex network would be large. For example, if there are 800 components in the equipment, then there may be about 3000 possible faults. There could be of the order of $2^{800}$ different configurations. Assuming the need to train the system 1000 times for each fault, and it takes say 1 second per training session, then it will take $3 \times 10^6$ seconds or 800 hours to train each configuration. If the training procedure was performed for every configuration then the time required would be longer than the life of the universe. Whilst for small, fixed systems, neural nets are a good solution for fault diagnosis, other approaches are clearly desirable for complex equipment.

U.S. Pat. No. 5,544,308 describes a system for the automated diagnosis of faults containing repairable parts using a fault/symptom matrix and performing tests in order to identify a suspect list of faults. The system produces lists of suspect faults by discarding possible faults according to a set of criteria. If any suspect faults are found, the system goes on to work out what test would be best to use next to eliminate as many faults from the set as possible. If no suspect faults are found, the system loosens its criteria until there are some suspects, and then performs the test selection, iteratively until only one suspect fault remains. The fault diagnosis provided by the system is not efficient, particularly in relation to complex equipment in which there are large numbers of possible faults and correspondingly large sets of symptoms.

It is therefore an object of the present invention to provide a fault diagnosis system for use in complex equipment which does not suffer from the disadvantages of expert systems or neural nets.

In accordance with the present invention there is provided a fault diagnosis system for diagnosing faults in complex equipment, the system including:

means for storing a set of diagnostic signatures which relates a set of known faults which may occur in the equipment to respective fault symptoms which are deemed indicative of said known faults; and means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment.

The fault diagnosis system of the invention uses the concepts of faults and symptoms. Herein, a fault is a system characteristic that causes part of the system to fail and lose some of its functionality. From the fault description, the maintainer should be able to isolate the faulty component and effect a repair. Herein, a symptom is an element of the system state which is indicative of a fault. One symptom may be present in several faults, and one fault may exhibit several symptoms. Faults essentially have a diagnostic signature of symptoms. Generally, each fault should have a unique diagnostic signature of symptoms.

The system may be arranged to calculate the diagnostic data such that a fault symptom being present in said current state symptoms and being deemed indicative of a known fault in said diagnostic signatures provides a cumulative positive contribution to a value indicative of likelihood of the corresponding fault being causative.

The system may also be arranged to calculate the diagnostic data such that a fault symptom being present in said current state symptoms and being deemed indicative of a known fault in said diagnostic signatures provides a more positive contribution to a value indicative of likelihood of the corresponding fault being causative, than the fault symptom not being present in said current state symptoms.

Preferably, the system may be arranged to calculate the diagnostic data such that a fault symptom, which is deemed indicative of a relatively high number of known faults in said diagnostic signatures, being present in said current state symptoms and being deemed indicative of a known fault in said diagnostic signatures provides a less positive contribution to a value indicative of likelihood of the corresponding fault being causative, than the contribution to the same value provided by a different fault symptom, which is deemed indicative of a relatively low number of known faults in said diagnostic signatures, being present in said current state symptoms and being deemed indicative of the same fault in said diagnostic signatures. In this case, system may be arranged to calculate the diagnostic data such that a fault symptom being present in said current state symptoms and being deemed indicative of a known fault in said diagnostic signatures, provides a contribution to a value indicative of likelihood for the corresponding fault which is normalised relative to the number of known faults of which the fault symptom is deemed indicative of said diagnostic signatures.

The diagnostic signatures may relate the set of known faults which may occur in the equipment to respective fault symptoms which are deemed unrelated to said known faults. The system may be arranged to calculate the diagnostic data such that a fault symptom being present in said current state symptoms and being deemed unrelated to a known fault in said diagnostic signatures provides a cumulative negative contribution to a value indicative of likelihood of the corresponding fault being causative. Alternatively, the system is arranged to calculate the diagnostic data such that a fault symptom being present in said current state symptoms and being deemed indicative of a known fault in said diagnostic signatures provides a more positive contribution to a value indicative of likelihood of the corresponding fault being causative, than a different fault symptom not being present in said current state symptoms and being deemed unrelated to the fault in said diagnostic signatures.

As an alternative, the system may be arranged to calculate the diagnostic data such that a fault symptom being present in said current state symptoms and being deemed indicative of a known fault in said diagnostic signatures provides a more positive contribution to a value indicative of likelihood of the corresponding fault being causative, than a different fault symptom being present in said current state symptoms and being deemed unrelated to the fault in said diagnostic signatures.

The system may be arranged to calculate the diagnostic data such that a fault symptom not being present in said current state symptoms and being deemed indicative of a known fault in said diagnostic signatures provides a more positive contribution to a value indicative of likelihood of the corresponding fault being causative, than a different fault symptom being present in said current state symptoms and being deemed unrelated to the fault in said diagnostic signatures.

The system may also be arranged such that a fault symptom which is deemed unrelated to a known fault has a more positive contribution to a value indicative of likelihood for the fault, when the symptom is not present in said current state symptoms, than the contribution of the same symptom, when present in said current state symptoms, to a value indicative of likelihood for the same fault probability.

Furthermore, the system may be arranged to calculate the diagnostic data such that a fault symptom, which is deemed unrelated to a relatively high number of known faults in said diagnostic signatures, being present in said current state symptoms and being deemed unrelated to a known fault in said diagnostic signatures provides a less negative contribution to a value indicative of likelihood of the corresponding fault being causative, than the contribution to the same value provided by a different fault symptom, which is deemed unrelated to a relatively low number of known faults in said diagnostic signatures, being present in said current state symptoms and being deemed unrelated to the same fault in said diagnostic signatures.

Ideally, the diagnostic signatures relate the set of known faults which may occur in the equipment to respective fault symptoms which are non-diagnostic in relation to said known faults. The diagnostic signatures may identify a fault symptom to be non-diagnostic in relation to a first known fault, and to be indicative of a second known fault. In either case, the system is arranged to calculate the diagnostic data such that a fault symptom being present in said current state symptoms and being deemed non-diagnostic in relation to a known fault in said diagnostic signatures provides a contribution to a value indicative of likelihood of the corresponding fault being causative, which is similar to a contribution provided to the same value by a different fault symptom not being present in said current state symptoms and being deemed non-diagnostic in relation to the fault in said diagnostic signatures.

Advantageously, the system is capable of receiving current state symptoms input by a human operator. The system may prompt the operator for the input of such symptoms or the operator may input the symptoms unprompted. In either case, the system is arranged to calculate values indicative of diagnostic rejection power for different possible symptoms to suggest a current state symptom which is to be input by a human operator in order to improve the diagnosis. Here, the system uses said calculated values indicative of likelihood in calculating said rejection values.

As alternative to receiving current state symptoms, the system may receive an indication of a fault fix input by a human operator, and to recalculate said diagnostic data in response thereto.

The system may calculate values indicative of diagnostic benefit for different possible fault fixes to be performed by a human operator in order to improve the diagnosis. The calculated values are used as being indicative of likelihood in calculating said benefit values.

In addition, the system may store mean time before failure values for equipment components, and is capable of calculating said values indicative of likelihood using said mean time before failure values.

Different diagnostic modes in which said probabilities are calculated using different algorithmic methods may be carried out by the system. In a first diagnostic mode, said probabilities are calculated using a first relationship with said mean time before failure values, and in a second diagnostic mode, said probabilities are calculated using a second relationship with said mean time before failure values. In said second diagnostic mode, said values indicative of likelihood are calculated without reference to said mean time before failure values.

The values indicative of likelihood may be calculated using a weighting function applied to a set of calculated values to produce the said values indicative of likelihood. Such a weighting function may be a substantially monotonic function or an exponential function.

In addition, the values indicative of likelihood are calculated using normalisation across a calculated set of values.

Preferably, the system is arranged to be capable of calculating the diagnostic data by calculating a first set of values indicative of likelihood, identifying faults which have relatively small likelihoods of being causative, and performing a recalculation of said diagnostic data whilst taking said faults having relatively small likelihoods of being causative to have an effectively zero likelihood of being causative. In this case, the diagnostic signatures of said faults having relatively small likelihoods of being causative are omitted from said recalculation.

The system may be arranged to calculate sets of diagnostic data in relation to sets of fault symptoms identifying current states of the system in iterative steps using continually improved knowledge of the current state of the system at each step.

Additionally, similar symptoms may be associated for ease of diagnosis.

In accordance with a second aspect of the present invention, there is provided computer software arranged to implement the system described above.

In accordance with a further aspect of the present invention, there is provided a computer-implemented method for diagnosing faults in complex equipment, the method comprising:

storing a set of diagnostic signatures which relates a set of known faults which may occur in the equipment to respective fault symptoms which are deemed indicative of said known faults; and processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment.

The fault diagnosis system of the present invention monitors and stores the current state of the system under diagnosis. It also holds a repository of diagnostic knowledge, detailing known ways the system can fail, and what the characteristics of each failure are. Whenever requested, the fault diagnosis system performs a diagnosis, in which the likelihoods of all possible faults are calculated given the current state of the system.

The fault diagnosis system maintains a data set called the Symptom Vector which contains the current state of symptoms on the system. The fault diagnosis system also holds the list of all known faults and all known symptoms, and a pattern which correlates the faults with the symptoms. This can be maintained in one or both of two forms: the Fault Exemplar, which holds all fault signature information, and the Diagnostic Exemplar, which holds the fault signature information in a preprocessed form which has improved diagnostic power, ready for quick diagnosis.

When requested, the fault diagnosis system pre-multiplies the Symptom Vector by the Diagnostic Exemplar, to give a vector of scores for each fault, in an effective manner in terms of processing cost. The highest scoring fault is the most likely to be the causative one. Algorithms used in the fault diagnosis system convert this vector of scores into a vector of probabilities.

The fault diagnosis system deals with automatic symptoms, which are produced by sensors in the system being diagnosed, and continually maintains the state of the Symptom Vector as the state of the system alters. It also deals with manual symptoms, which are to be input by a human operator diagnosing the system, referred to herein as the maintainer. The processor uses algorithms for identifying the best manual symptom or symptoms to be characterised by the maintainer. Further algorithms used by the fault diagnosis system allow trade-offs between the relative benefits of fixing faults against investigating symptoms.

Further features and advantages of the invention will become apparent from the following description of preferred embodiments of the invention, given by way of example only and made with reference to the accompanying drawings, wherein:

FIGS. 3 to 5 illustrate user interfaces presented to a maintainer in accordance with an embodiment of the invention.

Figure 1:
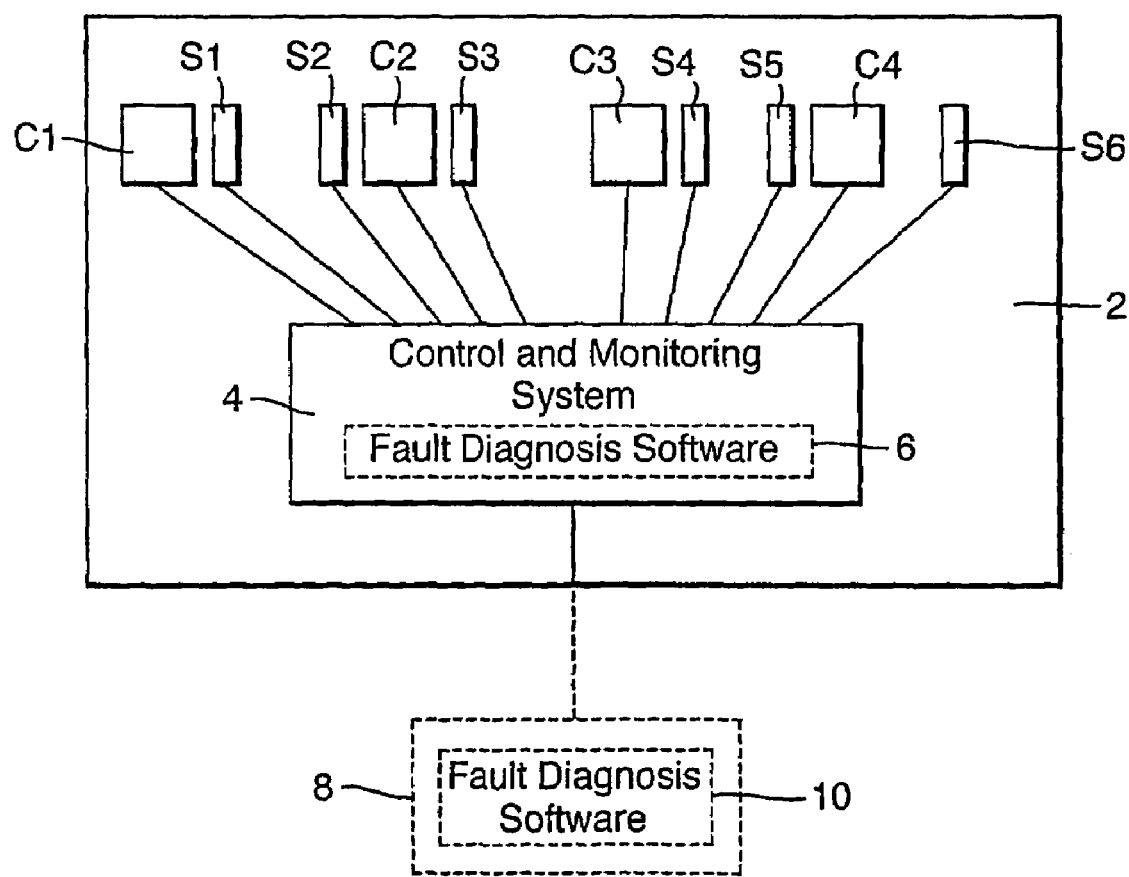
FIG. 1 is a schematic diagram of complex equipment and a fault diagnosis system therefor.

Referring to FIG. 1, complex equipment 2, for example a satellite communications network, typically includes a control and monitoring system 4, for example one or more computing platforms, various equipment components C1, C2, C3 . . . and various sensors S1, S2, S3 . . . for sensing symptoms relating to the components. Sensors may also be used to sense ambient conditions, such as atmospheric temperature, atmospheric pressure, etc. Fault symptoms may be derived from any of the sensors or directly from any of the components. The equipment 2 may include in-built fault diagnosis software 6, or a fault diagnosis instrument, for example a laptop computer, running fault diagnosis to software in accordance with an embodiment of the invention. The fault diagnosis software embodies the fault diagnosis system of the present invention.

It is to be noted that the control and monitoring system 4 also includes one or more interfaces (not shown) for interfacing with the complex equipment. It will be appreciated that the interfaces may be multi-level, each level of interface being designed for individual users of the diagnostic system. For example, there may be a requirement for a maintainer interface in addition to a developer interface and a user interface.

It will also be appreciated that the profile of each user may include a particular set up of available windows, buttons, menus and toolbars, and that each user may have more than one profile according to the tasks to be completed.

Figure 2:
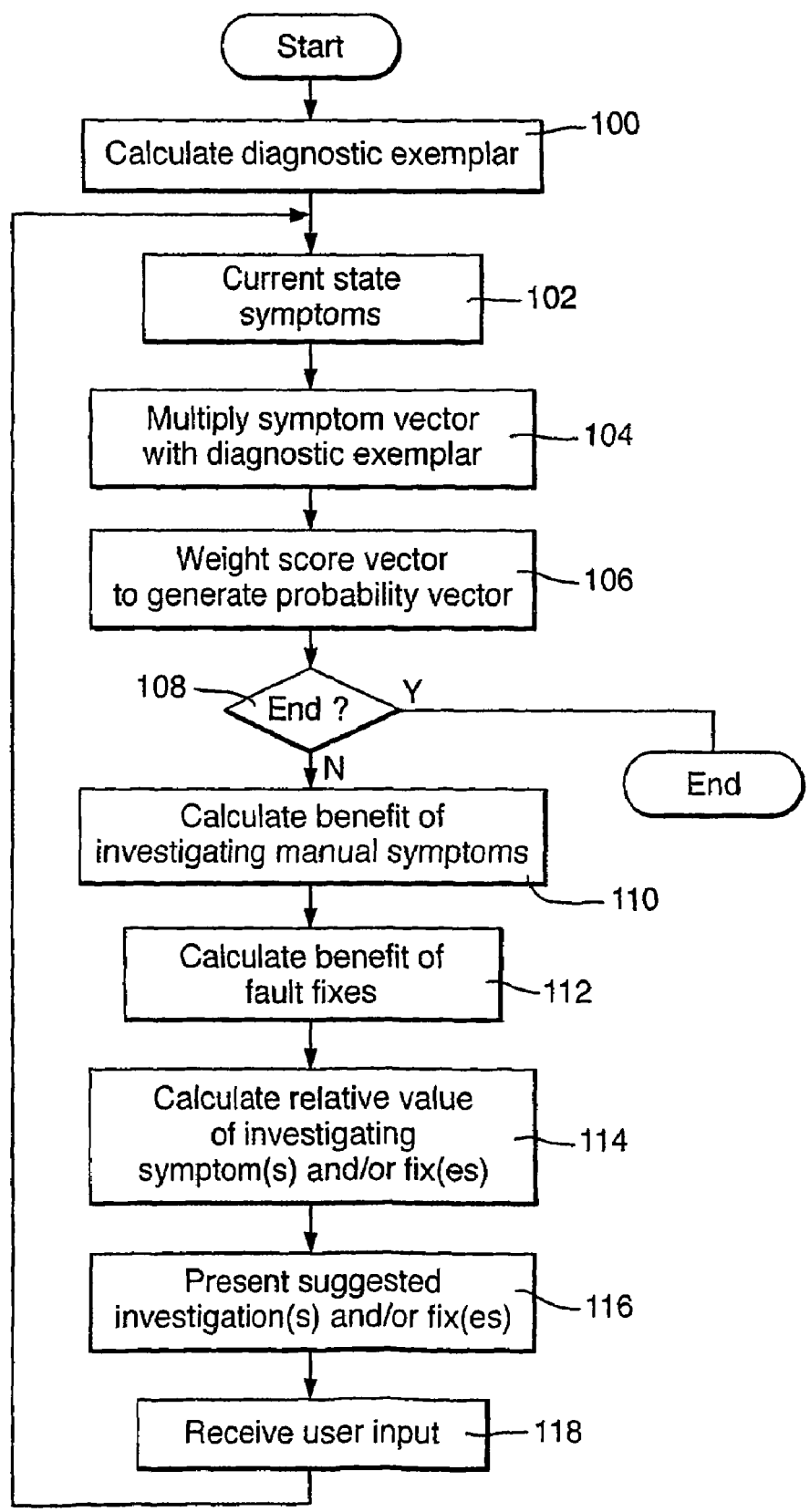
FIG. 2 is a flow diagram illustrating steps carried out by the fault diagnosis system in an embodiment of the invention.

Referring to FIG. 2, the fault diagnosis system performs various steps, to be described in further detail below. Each of Steps 100 to 118 is as described in the text of the flow diagram, and will be understood further from the procedures explained in further detail below.

The fault diagnosis system stores diagnostic signatures in a matrix, termed the Fault Exemplar. The Fault Exemplar is a two dimensional matrix of symptoms and faults comprising a set of fault diagnostic signatures which represent the system fault behaviour. The faults label the columns of the matrix, and the symptoms label the rows. Each cell in the matrix can have one of three different states:

The symptom is always present when the fault occurs. "1" represents this.

The symptom is never present when the fault occurs. "0" represents this.

The symptom is sometimes present when the fault occurs. "*" represents this.

The fault diagnosis system algorithm manipulates the Fault Exemplar matrix, which represents the raw diagnostic information, into a Diagnostic Exemplar matrix, which is used to diagnose the system. This manipulation is carried out in Step 100 of FIG. 2. The Diagnostic Exemplar contains only floating point numbers, generally having various fractional values between −1 and +1.

Alternatively, the fault diagnosis system may store the Diagnostic Exemplar matrix in pre-computed form. Both the Fault Exemplar and the Diagnostic Exemplar hold diagnostic signatures which relate a known fault which may occur in the equipment to respective fault symptoms which are deemed indicative of said known faults.

A diagnostic symptom can have one of three values: it can be present, it can be absent, or it can be unknown. If the symptom value is 1 (if present), or 0 (if absent), in both cases it is diagnostic (being considered within a diagnosis). If it is unknown, then it is non-diagnostic, and is not considered within the diagnosis. This is represented in the following table.

| Symptom State | Diagnostic processor value | Symptom is diagnostic |
|---|---|---|
| Present | 1 | Yes |
| Absent | 0 | Yes |
| Unknown | <not applicable> | No |

If the symptom's state is detectable (either present or absent), and characterises one or more faults, then the symptom is incorporated into the diagnostic knowledge and included in the Fault Exemplar (and hence the Diagnostic Exemplar), since the symptom is "diagnostic". If the state of the symptom is not capable of being known, or characterises none of the known faults, then it is excluded from the diagnostic knowledge (and hence from the Diagnostic Exemplar), and the symptom is "non-diagnostic".

The Diagnostic Exemplar is also a matrix, which contains real numbers in the range −1 to +1. The "1"s, "0"s and "*"s of the Fault Exemplar have been reduced to an easily managed form which the computer can quickly process. An algorithm is used to convert the Fault Exemplar to the Diagnostic Exemplar.

This conversion algorithm is best understood by an example. In the following example, there are four possible faults: $f_1$, $f_2$, $f_3$, and $f_4$, and nine possible symptoms: $s_1$, $s_2$, ..., to $s_9$.

Fault $f_1$ produces symptoms $s_1$, $s_3$, $s_5$, $s_7$, $s_9$.
Fault $f_2$ produces symptoms $s_1$, $s_2$, $s_3$.
Fault $f_3$ produces symptoms $s_4$, $s_5$.
Fault $f_4$ produces symptoms $s_3$, $s_4$, $s_5$, $s_6$, $s_7$, $s_8$, $s_9$.

The algorithmic conversion may now be described using a matrix representation, where the first column corresponds to the fault signature of $f_1$, the second to that of $f_2$ and so on. The first row represents $s_1$ etc. The set of fault signatures can be represented by the following matrix, called $M_0^T$:

$$M_0^T = \begin{pmatrix} 1 & 1 & 0 & 0 \\ 0 & 1 & 0 & 0 \\ 1 & 1 & 0 & 1 \\ 0 & 0 & 1 & 1 \\ 1 & 0 & 1 & 1 \\ 0 & 0 & 0 & 1 \\ 1 & 0 & 0 & 1 \\ 0 & 0 & 0 & 1 \\ 1 & 0 & 0 & 1 \end{pmatrix}$$

This matrix, $M_0^T$, is the Fault Exemplar.

The conversion algorithm manipulates the transpose of $M_0^T$, which is $M_0$, and has contents:

$$M_0 = \begin{pmatrix} 1 & 0 & 1 & 0 & 1 & 0 & 1 & 0 & 1 \\ 1 & 1 & 1 & 0 & 0 & 0 & 0 & 0 & 0 \\ 0 & 0 & 0 & 1 & 1 & 0 & 0 & 0 & 0 \\ 0 & 0 & 1 & 1 & 1 & 1 & 1 & 1 & 1 \end{pmatrix}$$

Next, the algorithm produces the matrix $M_1$, which contains the symptoms normalised by their discrimination power, by normalising each column to sum to 1. A symptom that appears on several faults is not as useful at discriminating as one which is unique to a fault or appears in a smaller number of fault signatures. Thus, $s_2$ only appears as a symptom of $f_2$, and has more weight than $S_3$, which appears on faults $f_1$, $f_2$ and $f_4$.

$$M_1 = \begin{pmatrix} 0.5 & 0 & 0.333333 & 0 & 0.333333 & 0 & 0.5 & 0 & 0.5 \\ 0.5 & 1 & 0.333333 & 0 & 0 & 0 & 0 & 0 & 0 \\ 0 & 0 & 0 & 0.5 & 0.333333 & 0 & 0 & 0 & 0 \\ 0 & 0 & 0.333333 & 0.5 & 0.333333 & 1 & 0.5 & 1 & 0.5 \end{pmatrix}$$

The next stage is to normalise across the matrix, so that each of the rows sums to 1, which produces the matrix $M_2$.

$$M_2 = \begin{pmatrix} 0.230769 & 0 & 0.153846 & 0 & 0.153846 & 0 & 0.230769 & 0 & 0.230769 \\ 0.272727 & 0.545454 & 0.181818 & 0 & 0 & 0 & 0 & 0 & 0 \\ 0 & 0 & 0 & 0.6 & 0.4 & 0 & 0 & 0 & 0 \\ 0 & 0 & 0.08 & 0.12 & 0.08 & 0.24 & 0.12 & 0.24 & 0.12 \end{pmatrix}$$

This matrix when multiplied by a Symptom Vector "rewards" symptoms present in the current state matching fault symptoms present in signatures.

Next a matrix $N_0$ is defined using $M_0$, but replacing all 1's for 0's and 0's for 1's.

$$N_0 = \begin{pmatrix} 0 & 1 & 0 & 1 & 0 & 1 & 0 & 1 & 0 \\ 0 & 0 & 0 & 1 & 1 & 1 & 1 & 1 & 1 \\ 1 & 1 & 1 & 0 & 0 & 1 & 1 & 1 & 1 \\ 1 & 1 & 0 & 0 & 0 & 0 & 0 & 0 & 0 \end{pmatrix}$$

This matrix is normalised down the columns to produce $N_1$:

$$N_1 = \begin{pmatrix} 0 & 0.333333 & 0 & 0.5 & 0 & 0.333333 & 0 & 0.333333 & 0 \\ 0 & 0 & 0 & 0.5 & 1 & 0.333333 & 0.5 & 0.333333 & 0.5 \\ 0.5 & 0.333333 & 1 & 0 & 0 & 0.333333 & 0.5 & 0.333333 & 0.5 \\ 0.5 & 0.333333 & 0 & 0 & 0 & 0 & 0 & 0 & 0 \end{pmatrix}$$

Now $N_2$ is produced from $N_1$ by normalising along the rows:

$$N_2 = \begin{pmatrix} 0 & 0.222222 & 0 & 0.333333 & 0 & 0.222222 & 0 & 0.222222 & 0 \\ 0 & 0 & 0 & 0.157895 & 0.315789 & 0.105263 & 0.157895 & 0.105263 & 0.157895 \\ 0.142857 & 0.095238 & 0.285714 & 0 & 0 & 0.095238 & 0.142857 & 0.095238 & 0.142857 \\ 0.6 & 0.4 & 0 & 0 & 0 & 0 & 0 & 0 & 0 \end{pmatrix}$$

This matrix, when multiplied by a Symptom Vector and subtracted, "penalises" symptoms present in the current state which do not match symptoms present in fault signatures.

Finally, a matrix $M_3$ is produced from $M_2$ and $N_2$.

$$M_3 = M_2 - N_2$$

The contents of $M_3$ are:

$$M_3 = \begin{pmatrix} 0.230769 & -0.222222 & 0.153846 & -0.333333 & 0.153846 & -0.222222 & 0.230769 & -0.222222 & 0.230769 \\ 0.272727 & 0.545454 & 0.181818 & -0.157895 & -0.315789 & -0.105263 & -0.157895 & -0.105263 & -0.157895 \\ -0.142857 & -0.095238 & -0.285714 & 0.6 & 0.4 & -0.095238 & -0.142857 & -0.095238 & -0.142857 \\ -0.6 & -.04 & 0.08 & 0.12 & 0.08 & 0.24 & 0.12 & 0.24 & 0.12 \end{pmatrix}$$

$M_3$ is the Diagnostic Exemplar in this example. The Diagnostic Exemplar includes a set of diagnostic signatures of faults, with significantly improved diagnostic power than the Fault Exemplar.

The fault diagnosis system builds up a current state representation for each symptom represented within the Fault Exemplar. The diagnostic system builds up a column vector of the system's current set of fault symptoms. This corresponds to Step 102. If present, then the symptom is given the value 1, if absent, then it is given the value of 0. The column vector of symptom states is known as the Symptom Vector. Diagnostic symptoms are present in the Symptom Vector, non-diagnostic symptoms are not.

An (extremely simple) exemplary four symptom Symptom Vector is:

$$\begin{pmatrix} 1 \\ 1 \\ 0 \\ 0 \end{pmatrix}$$

However, it will be appreciated that the Symptom Vector is generally more complex than that illustrated above, that is, the Symptom Vector is a column vector comprising a plurality of rows, each element being "1" or "0".

The fault diagnosis system uses a diagnostic algorithm which performs a matrix multiplication of the Diagnostic Exemplar, by the Symptom Vector. This is illustrated in Step 104. This results in a set of scores, which are probabilities which represent likelihoods of each of the faults being present in the current state of the equipment and diagnosis. A perfectly matching fault will have a score of 1 (that is, all expected symptoms are present and no unexpected symptoms). The reverse of this (all of the expected symptoms absent, and all of the unexpected symptoms present) would give a score of −1. All other scores fall in between. Better matches give values closer to 1, and worse matches give values closer to −1. A Symptom Vector of all 1s or all 0s will give a score of 0 to all faults.

In the following example the Diagnostic Exemplar is tested against sets of Symptom Vectors replicating fault signatures except that a "0" is entered (symptom not present) for each non-diagnostic symptom in the respective fault signatures. Let $S_1$ be the fault signature for fault $f_1$, and $S_2$, $S_3$, $S_4$ be for $f_2$, $f_3$, $f_4$. Then $$S_1 = \begin{pmatrix} 1 \\ 0 \\ 1 \\ 0 \\ 1 \\ 0 \\ 1 \\ 0 \\ 1 \end{pmatrix} \quad S_2 = \begin{pmatrix} 1 \\ 1 \\ 1 \\ 0 \\ 0 \\ 0 \\ 0 \\ 0 \\ 0 \end{pmatrix} \quad S_3 = \begin{pmatrix} 0 \\ 0 \\ 0 \\ 1 \\ 1 \\ 0 \\ 0 \\ 0 \\ 0 \end{pmatrix} \quad S_4 = \begin{pmatrix} 0 \\ 0 \\ 1 \\ 1 \\ 1 \\ 1 \\ 1 \\ 1 \\ 1 \end{pmatrix}$$

$$M_3 S_1 = \begin{pmatrix} 1 \\ -0.17703 \\ -0.31429 \\ -0.2 \end{pmatrix} \quad M_3 S_2 = \begin{pmatrix} 0.16239 \\ 1 \\ -0.52381 \\ -0.92 \end{pmatrix}$$

$$M_3 S_3 = \begin{pmatrix} -0.17949 \\ -0.47368 \\ 1 \\ 0.2 \end{pmatrix} \quad M_3 S_4 = \begin{pmatrix} -0.00855 \\ -0.81818 \\ 0.23810 \\ 1 \end{pmatrix}$$

The effect of pre-multiplying a Symptom Vector with the Diagnostic Exemplar, is to produce a vector of fault scores. It can be seen that the score of the fault corresponding to the Symptom Vector in each case is 1 (100%), and that the scores of the other faults are significantly lower.

Therefore, a basic diagnosis is achieved by sorting the faults in order of score, and picking the one with the highest score. The score is a basic value indicating a likelihood of the fault being causative of the current system state.

Although the score is helpful in identifying faults, a better understanding of the likelihood of a fault is obtained by generating weighted probabilities to each of the possible faults. Step 106 illustrates applying a weight score vector to generate a Probability Vector. The fault diagnosis system calculates probabilities by weighting each score by a monotonic function, and normalising, so the total probabilities sum to unity. Preferably, an exponential weighting function is used. This provides a significantly more meaningful result. The probabilities are improved values indicating likelihood of faults being causative, and are used in much of the subsequent processing.

It should be understood that the values generated, whether scores or weighted probabilities, are relative. A fault with a higher score or probability is more likely to be the best match to the symptoms presented.

In one embodiment, a weighting function of $$\frac{e^{Bs}}{A + e^{Bs}}$$

is used, where "s" is the score, and where "A" and "B" are calculated from the number of symptoms and faults. However, it has been found that this weighting function has a poor performance when a number of the scores are close to 1.

In a preferred embodiment, a weighting function of $e^{20s}$ is used. This has been found to give better results in a broad range of scenarios, especially where there are several results with scores close to 1. The effect of this function is to separate out items with scores that differ by 0.1 with a difference in probability of about a factor of 10.

After the generation of a Probability Vector, it is possible to end the fault diagnosis as indicated by Step 108. However, by doing so at this stage, there is no indication of the additional benefit which can be achieved if user observed symptoms are also input to the system.

In certain cases, it can not be stated definitely whether a fault produces a certain symptom or not. Therefore, the algorithm preferably can cope with a symptom which may or may not appear for a given fault, in which case the symptom is non-diagnostic in relation to that fault (although it may be indicative of a different fault when present).

There are several reasons for symptoms not always appearing with a fault:
1. The symptom may be difficult for unskilled maintainers to identify.
2. The symptom may be part of a cluster of symptoms monitoring different thresholds on the same measurement. The fault may cause an intermediate state of the system to appear, which can only be approximately estimated in the laboratory.
3. The mechanism providing the symptom may be subject to noise or drift.
4. There may be insufficient knowledge about the system to ascertain whether the fault produces the symptom.

The presence or absence of such "possible" symptoms should not affect the diagnosis and are therefore treated as non-diagnostic for one or more faults. The following example, based upon the previous one, shows how the algorithm copes with such non-diagnostic symptoms.

As in the previous example, there are four possible faults: $f_1$, $f_2$, $f_3$, and $f_4$, and 9 possible symptoms: $s_1$, $s_2$, ..., to $s_9$.

Fault $f_1$ always produces symptoms $s_1$, $s_3$, $s_5$, $s_7$, $s_9$.

Fault $f_2$ always produces symptoms $s_1$, $s_2$, $s_3$ and may produce $s_8$, $s_9$.

Fault $f_3$ always produces symptoms $s_4$, $s_5$. And may produce $s_1$, $s_2$, $s_3$.

Fault $f_4$ always produces symptoms $s_3$, $s_4$, $s_5$, $s_6$, $s_7$, $s_8$, $s_9$.

The algorithmic process may now be described using a matrix-like representation, where the first column is a fault signature which corresponds to $f_1$, the second to $f_2$ and so on. The first row represents $s_1$, etc. The above set of faults and symptoms can be represented by the following pattern of symbols, which is the new Fault Exemplar. It is a matrix-like representation, but can not be called a matrix because it has non-numeric values, which can not be manipulated by conventional matrix methods. A "1" means that a fault produces a symptom, a "0" means that a fault does not produce a symptom, and a "*" means that the system is non-diagnostic for the fault in question.

$$\text{Fault Exemplar} = \begin{pmatrix} 1 & 1 & * & 0 \\ 0 & 1 & * & 0 \\ 1 & 1 & * & 1 \\ 0 & 0 & 1 & 1 \\ 1 & 0 & 1 & 1 \\ 0 & 0 & 0 & 1 \\ 1 & 0 & 0 & 1 \\ 0 & * & 0 & 1 \\ 1 & * & 0 & 1 \end{pmatrix}$$

From this the same $M_0^T$ matrix is formed as before, where each "*" is replaced by "0":

$$M_0^T = \begin{pmatrix} 1 & 1 & 0 & 0 \\ 0 & 1 & 0 & 0 \\ 1 & 1 & 0 & 1 \\ 0 & 0 & 1 & 1 \\ 1 & 0 & 1 & 1 \\ 0 & 0 & 0 & 1 \\ 1 & 0 & 0 & 1 \\ 0 & 0 & 0 & 1 \\ 1 & 0 & 0 & 1 \end{pmatrix}$$

and into a matrix $P^T$ holding "1"s only where the "*" information is found, and "0"s elsewhere:

$$P^T = \begin{pmatrix} 0 & 0 & 1 & 0 \\ 0 & 0 & 1 & 0 \\ 0 & 0 & 1 & 0 \\ 0 & 0 & 0 & 0 \\ 0 & 0 & 0 & 0 \\ 0 & 0 & 0 & 0 \\ 0 & 0 & 0 & 0 \\ 0 & 1 & 0 & 0 \\ 0 & 1 & 0 & 0 \end{pmatrix}$$

The fault diagnosis system manipulates the transpose of $M^{oT}$ and $P^T$ which are $M_0$ and $P$. $M_0$ has contents:

$$M_0 = \begin{pmatrix} 1 & 0 & 1 & 0 & 1 & 0 & 1 & 0 & 1 \\ 1 & 1 & 1 & 0 & 0 & 0 & 0 & 0 & 0 \\ 0 & 0 & 0 & 1 & 1 & 0 & 0 & 0 & 0 \\ 0 & 0 & 1 & 1 & 1 & 1 & 1 & 1 & 1 \end{pmatrix}$$

P has contents:

$$P = \begin{pmatrix} 0 & 0 & 0 & 0 & 0 & 0 & 0 & 0 & 0 \\ 0 & 0 & 0 & 0 & 0 & 0 & 0 & 1 & 1 \\ 1 & 1 & 1 & 0 & 0 & 0 & 0 & 0 & 0 \\ 0 & 0 & 0 & 0 & 0 & 0 & 0 & 0 & 0 \end{pmatrix}$$

Next, the fault diagnosis system produces the matrix $M_1$ from $M_0$, containing the symptoms normalised by their discrimination power. Thus, each column is made to sum to 1. A symptom that appears on several faults is not as useful at discriminating as one which is unique to a fault, or to a smaller number of faults. Since, $s_2$ only appears as a symptom of $f_2$, it thus has more weight than $s_3$, which appears on faults $f_1$, $f_2$ and $f_4$.

$$M_1 = \begin{pmatrix} 0.5 & 0 & 0.333333 & 0 & 0.333333 & 0 & 0.5 & 0 & 0.5 \\ 0.5 & 1 & 0.333333 & 0 & 0 & 0 & 0 & 0 & 0 \\ 0 & 0 & 0 & 0.5 & 0.333333 & 0 & 0 & 0 & 0 \\ 0 & 0 & 0.333333 & 0.5 & 0.333333 & 1 & 0.5 & 1 & 0.5 \end{pmatrix}$$

The next stage is to normalise across the matrix, so that each of the rows sums to 1, to produce the matrix $M_2$.

$$M_2 = \begin{pmatrix} 0.230769 & 0 & 0.153846 & 0 & 0.153846 & 0 & 0.230769 & 0 & 0.230769 \\ 0.272727 & 0.545454 & 0.181818 & 0 & 0 & 0 & 0 & 0 & 0 \\ 0 & 0 & 0 & 0.6 & 0.4 & 0 & 0 & 0 & 0 \\ 0 & 0 & 0.08 & 0.12 & 0.08 & 0.24 & 0.12 & 0.24 & 0.12 \end{pmatrix}$$

This matrix when multiplied by a Symptom Vector "rewards" symptoms present in the current state matching symptoms present in fault signatures, as before, and also "rewards" symptoms present in the current state matching symptoms which are non-diagnostic in fault signatures.

Next a matrix $N_0$ is defined which is the one's complement of $M_0$, made by replacing all 1's for 0's and 0's for 1's.

$$N_0 = \begin{pmatrix} 0 & 1 & 0 & 1 & 0 & 1 & 0 & 1 & 0 \\ 0 & 0 & 0 & 1 & 1 & 1 & 1 & 1 & 1 \\ 1 & 1 & 1 & 0 & 0 & 1 & 1 & 1 & 1 \\ 1 & 1 & 0 & 0 & 0 & 0 & 0 & 0 & 0 \end{pmatrix}$$

The matrix $N'_0$ is produced which is $N_0 - P$ $$N'_0 = \begin{pmatrix} 0 & 1 & 0 & 1 & 0 & 1 & 0 & 1 & 0 \\ 0 & 0 & 0 & 1 & 1 & 1 & 1 & 0 & 0 \\ 0 & 0 & 0 & 0 & 0 & 1 & 1 & 1 & 1 \\ 1 & 1 & 0 & 0 & 0 & 0 & 0 & 0 & 0 \end{pmatrix}$$

This matrix is normalised down the columns to produce $N_1$:

$$N_1 = \begin{pmatrix} 0 & 0.5 & 0 & 0.5 & 0 & 0.333333 & 0 & 0.5 & 0 \\ 0 & 0 & 0 & 0.5 & 1 & 0.333333 & 0.5 & 0 & 0 \\ 0 & 0 & 0 & 0 & 0 & 0.333333 & 0.5 & 0.5 & 1 \\ 1 & 0.5 & 0 & 0 & 0 & 0 & 0 & 0 & 0 \end{pmatrix}$$

Notice that symptom 3 has no representation at all in this matrix, and is normalised to all zero.

Now $N_2$ is produced from $N_1$ by normalising along the rows:

$$N_2 = \begin{pmatrix} 0 & 0.272727 & 0 & 0.272727 & 0 & 0.181818 & 0 & 0.272727 & 0 \\ 0 & 0 & 0 & 0.214286 & 0.428571 & 0.142857 & 0.214286 & 0 & 0 \\ 0 & 0 & 0 & 0 & 0 & 0.142857 & 0.214286 & 0.214286 & 0.428571 \\ 0.666667 & 0.333333 & 0 & 0 & 0 & 0 & 0 & 0 & 0 \end{pmatrix}$$

This matrix, when multiplied by a Symptom Vector and subtracted, "penalises" symptoms present in the current state which do not match fault signatures, as before, and also "penalises" symptoms present in the current state matching symptoms which are non-diagnostic in fault signatures.

Finally, a matrix $M_3$ is produced from $M_2$ and $N_2$.
$M_3 = M_2 - N_2$
The contents of $M_3$ are:

$$M_3 = \begin{pmatrix} 0230769 & -0272727 & 0153846 & -0272727 & 0153846 & -0181818 & 0230769 & -0272727 & 0230769 \\ 0272727 & 0545455 & 0181818 & -0214286 & -0428571 & -0142857 & -0214286 & 0 & 0 \\ 0 & 0 & 0 & 06 & 04 & -0142857 & -0214286 & -0214286 & -0428571 \\ -0666667 & -0333333 & 008 & 012 & 008 & 024 & 012 & 024 & 012 \end{pmatrix}$$

$M_3$ is the Diagnostic Exemplar in this example. The Diagnostic Exemplar includes diagnostic signatures of faults, with significantly improved diagnostic power than the Fault Exemplar. The effect of a non-diagnostic symptom being present or not present is neutral.

The Diagnostic Exemplar has the property, that when it multiplies a Symptom Vector, it rewards symptoms which match faults, but penalises symptoms which do not match faults. Note that there are zeroes in the position where a "*" was in the Fault Exemplar, so these are neither rewarded nor penalised. In a perfect match, where symptoms match a fault perfectly, and no symptoms are present which do not match, then a score of "1" (or 100%) will be given. If the symptoms are the antithesis of a set for a fault, then a score of "-1" (or -100%) will be given. A Symptom Vector of all "1"s or all "0"s will give a score of "0" to all faults.

The Diagnostic Exemplar, when multiplying a Symptom Vector, has the following characteristics:

1. If a symptom is present in the Symptom Vector where expected in the fault signature, it has a positive contribution to the fault score.
2. If no symptom is present in the Symptom Vector where expected in the fault signature, it has a neutral contribution to the fault score.
3. If no symptom is present in the Symptom Vector where no symptom is expected in the fault signature, it has a neutral contribution to the fault score.
4. If a symptom is present in the Symptom Vector where no symptom is expected in the fault signature, it has a negative contribution to the fault score.
5. If a symptom is either present or not present in the Symptom Vector where expected that it may occur in the fault signature, it has a neutral contribution to the fault score.

In this example a Diagnostic Exemplar is tested against sets of Symptom Vectors replicating fault signatures. Let $S_1$ be the Symptom Vector replicating the fault signature for fault $f_1$, and $S_2$, $S_3$, $S_4$ be for $f_2$, $f_3$, $f_4$. Then $$S_1 = \begin{pmatrix} 1 \\ 0 \\ 1 \\ 0 \\ 1 \\ 0 \\ 1 \\ 0 \\ 1 \end{pmatrix} \quad S_2 = \begin{pmatrix} 1 \\ 1 \\ 1 \\ 0 \\ 0 \\ 0 \\ 0 \\ 0 \\ 0 \end{pmatrix} \quad S_3 = \begin{pmatrix} 0 \\ 0 \\ 0 \\ 1 \\ 1 \\ 1 \\ 0 \\ 0 \\ 0 \end{pmatrix} \quad S_4 = \begin{pmatrix} 0 \\ 0 \\ 1 \\ 1 \\ 1 \\ 1 \\ 1 \\ 1 \\ 1 \end{pmatrix}$$

$$M_3 S_1 = \begin{pmatrix} 1 \\ -0.17703 \\ -0.31429 \\ -0.2 \end{pmatrix} \quad M_3 S_2 =$$

$$\begin{pmatrix} 0.16239 \\ 1 \\ -0.52381 \\ -0.92 \end{pmatrix} \quad M_3 S_3 = \begin{pmatrix} -0.17949 \\ -0.47368 \\ 1 \\ 0.2 \end{pmatrix} \quad M_3 S_4 = \begin{pmatrix} -0.00855 \\ -0.81818 \\ 0.23810 \\ 1 \end{pmatrix}$$

The effect of pre-multiplying a Symptom Vector with a Diagnostic Exemplar, is to produce a vector of fault scores. It can be seen that the fault score of the fault with an exact match to the fault signature in each case is "1" (100%), and that the fault scores of the other faults are much lower.

It is also instructive to test the Diagnostic Exemplar against Symptom Vectors replicating fault signatures except that a "1" is entered (symptom is present) for each non-diagnostic symptom in the respective fault signatures.

$$S'_2 = \begin{pmatrix} 1\\1\\1\\0\\0\\0\\0\\1\\1 \end{pmatrix} \quad S'_3 = \begin{pmatrix} 1\\1\\1\\1\\1\\0\\0\\0\\0 \end{pmatrix} \quad M_3 S'_2 = \begin{pmatrix} 0.06993\\1\\-0.6286\\-0.56 \end{pmatrix} \quad M_3 S'_3 = \begin{pmatrix} -0.00699\\0.357146\\1\\-0.72 \end{pmatrix}$$

The effect of multiplying these Symptom Vectors with the Diagnostic Exemplar, is to produce a vector of scores. It can be seen that adding the "possible" non-diagnostic symptoms has had no effect on the score for faults 2 and 3. Note however that scores for other faults have gone up or down as the pattern looks more or less like the respective fault signatures.

The fault diagnosis system uses as inputs a mixture of automatic symptoms and manual symptoms.

Automatic symptoms are those, which are generated in software from events coming from the system being diagnosed. Examples are a command is set, or a threshold has exceeded a value.

Manual symptoms are those which require human input to set them. Examples are something is leaking, making an unusual noise, or is damp. The fault diagnosis system has a man-machine interface (MMI), such as a touch screen or display, for receiving maintainer input specifying a manual symptom in the current state of the equipment. The system may prompt the user to input the symptoms or the user may input the symptoms unprompted.

Automatic symptoms are continually generated by the system. On the other hand, manual symptoms require human intervention, and take a certain amount of time and effort to investigate. A system which required the user to find the value of all of the (many hundred) symptoms before giving a diagnosis, particularly as most of them would be irrelevant to the fault, would be highly inconvenient in use.

The fault diagnosis system calculates a list of the most effective manual symptoms and notifies the maintainer of one or more suggested manual symptoms to be identified. The system calculates a rejection value of each as yet unknown symptom for the known faults, which indicates the percentage of faults which the symptom could be expected to reject if its state is determined, on a probabilistic basis, i.e. if presented with the same situation over and over again.

The fault diagnosis system uses an algorithm whereby the most appropriate symptom can be ascertained, given the current diagnosis. The algorithm uses a vector of probabilities with the possible manual symptoms to be identified. This is illustrated by Step 110 in FIG. 2. The algorithm is shown by example, rather than by formula.

The vector of scores is taken, and then converted to a vector of probabilities, using the weighting function and normalisation as before.

The probability calculation is illustrated in the following table:

| Score = s | Perceived probability = $e^{20s}$ | Normalised probability |
|---|---|---|
| 0.1 | 7.4 | 0.00003 |
| 0.6 | 162754.8 | 0.73103 |
| 0.55 | 59874.1 | 0.26894 |
| −0.1 | 0.1 | 0.00000 |
| Sum | 222636.4 | | and there are four possible manual symptoms $HS_1$, $HS_2$, $HS_3$, $HS_4$ represented as Fault Vectors where:

$$HS_1 = \begin{pmatrix} *\\1\\1\\0 \end{pmatrix} \quad HS_2 = \begin{pmatrix} *\\0\\1\\* \end{pmatrix} \quad HS_3 = \begin{pmatrix} *\\1\\*\\0 \end{pmatrix} \quad HS_4 = \begin{pmatrix} 1\\*\\*\\0 \end{pmatrix}$$

In the above Fault Vectors, $HS_1$ is present for faults $F_2$ and $F_3$, not present for $F_4$, and possible for $F_1$. Likewise $HS_2$ is present for $F_3$, absent for $F_2$, and unknown for $F_1$ and $F_4$, and so on.

A measure is required to find the best one ($HS_2$, which distinguishes between the leading contenders for the fault). $HS_1$ is no good because both of the likely faults exhibit the symptom. $HS_3$ is a little better although fault 3 has a possible value for one crucial symptom, but it has a good mark for the other one. $HS_4$ does not give any information for the two leading faults. A preferred algorithm thus gives good marks to $HS_2$, poor marks to $HS_4$ and $HS_1$, and intermediate marks to $HS_3$.

A "good" symptom should reject as much of the Fault Exemplar as possible. Thus, given the current normalised probability for a fault and the Fault Vector for each symptom, the probability of getting a symptom of zero multiplied by the amount rejected when getting an answer of zero is summed with the probability of getting a symptom of 1 multiplied by the amount rejected. The answer is the overall amount rejected. The calculation is shown in the following table.

| | $HS_1$ | $HS_2$ | $HS_3$ | $HS_4$ |
|---|---|---|---|---|
| Fault Vector Contents | * | * | * | 1 |
| | 1 | 0 | 1 | * |
| | 1 | 1 | * | * |
| | 0 | * | 0 | 0 |
| Probability of 0 - Corresponding to Fault Vector | 0.5 | 0.5 | 0.5 | 0 |
| | 0 | 1 | 0 | 0.5 |
| | 0 | 0 | 0.5 | 0.5 |
| | 1 | 0.5 | 1 | 1 |
| Prob0 - Calculated from above Vector and probabilities | 0.000015 | 0.731045 | 0.134485 | 0.499985 |
| Rejection of 0 - Corresponding to Fault Vector | 0 | 0 | 0 | 1 |
| | 1 | 0 | 1 | 0 |
| | 1 | 1 | 0 | 0 |
| | 0 | 0 | 0 | 0 |

-continued

|  | $HS_1$ | $HS_2$ | $HS_3$ | $HS_4$ |
|---|---|---|---|---|
| Rej0 - Calculated from above Vector and probabilities | 0.99997 | 0.26894 | 0.73103 | 0.00003 |
| Probability of 1 - Corresponding to Fault Vector | 0.5 | 0.5 | 0.5 | 1 |
|  | 1 | 0 | 1 | 0.5 |
|  | 1 | 1 | 0.5 | 0.5 |
|  | 0 | 0.5 | 0 | 0 |
| Prob1 - Calculated from above Vector and probabilities | 0.999985 | 0.268955 | 0.865515 | 0.500015 |
| Rejection of 1 - Fault Vector | 0 | 0 | 0 | 0 |
|  | 0 | 1 | 0 | 0 |
|  | 0 | 0 | 0 | 0 |
|  | 1 | 0 | 1 | 1 |
| Rej1 - Calculated from above Vector and probabilities | 0 | 0.73103 | 0 | 0 |
| Prob0 * Rej0 + Prob1 * Rej1 Power of Rejection | 0.000 | 0.393 | 0.098 | 0.000 |

The table of calculations shows that $HS_1$ had a rejection value of 0.000, $HS_2$ had 0.393, $HS_3$ had 0.098 and $HS_4$ had 0.000.

The optimal mark for rejection is 0.5, where on average half of the faults are rejected by a value of 0, and half by a value of 1, thus $HS_2$ is quite "good".

A fix of a fault can be effective as it will eliminate that fault from the analysis. So, in some senses, a fault fix can be thought of as a diagnostic step, just as much as the investigation of a symptom. This corresponds to Step 112 of FIG. 2.

The fault diagnosis system includes an algorithm to allow the diagnostic benefit of fault fixes to be compared on the same scale as investigating symptoms which require "Human Intervention". This corresponds to Step 114.

To compare the benefits of fault fixing and investigation, the algorithm defines an estimate of the cost in time to investigate then fix a fault given optimal conditions, namely:

$$C_{FIX}(N) = C_F + C_M \log_2 N$$

$C_{FIX}(N)$ is the cost of identifying and fixing a fault, given that there are N possible candidate faults, where:

$C_F$ is the average cost of fixing the fault, in minutes;

$\log_2 N$ is the estimated number of measures required, given that notionally, the best that can be expected is that each measure will split the population of remaining faults in two; and $C_F$ is the average symptom investigation time, in minutes.

The power of rejection of a symptom, $r_S$, is defined above. The investigation of a symptom will split the population of potential faults into two, those who have the symptom and those who do not. These are represented by probabilities $p_S$ and $(1-p_S)$ or $q_S$. But, $r_S = 2p_S(1-p_S)$. This can be rearranged to $$p_s = \frac{1}{2}\left(1 - \sqrt{1 - 2r_s}\right).$$

Note that this is an approximation, as the non-diagnostic ("*") values are not considered.

Once the symptom investigation has been performed and input by the maintainer, the population of N faults will be split into two. One population with $p_S N$ faults remaining, and the other with $q_S N$. The probability of these two occurrences is $p_S$ for the former and $q_S$ for the latter. The expected time to fix the system after making the measurement is therefore:

$$C_2 = p_S(C_F + C_M \log_2(p_S N)) + q_S(C_F + C_M \log_2(q_S N))$$

The progress of the measurement is therefore the estimated cost of fixing the fault before applying the symptom investigation less the cost of fixing after application. This is:

$$C_{FIX}(N) - C_2 = C_F + C_M \log_2 N - p_S(C_F + C_M \log_2(p_S N)) - q_S (C_F + C_M \log_2(q_S N))$$

Rearranging terms, this becomes:

$$C_{FIX}(N) - C_2 = -C_M(p_S \log_2 p_S + q_S \log_2 q_S)$$

When either $p_S$ or $q_S$ are zero, then the expression becomes zero. When they are both 0.5, then this reduces to $C_M$.

Thus, the progress of the step can be calculated. Its cost is known, therefore the value of the investigation of the symptom is the ratio of the two. The information relating to suggested investigation(s) and/or fix(es) is presented to a user or maintainer in Step 116.

The user or maintainer may find a given fault by following investigations. Alternatively, the user or maintainer may find the fault by fixing faults in turn until the given fault's symptoms disappear. The last fault fixed is then known to the be the one.

When a user or maintainer performs a fault fix, this may result in fixing the causative fault, and there is therefore a chance that there would be no more diagnostic work to be done. The other alternative, is that the fault was not the one fixed, in which case, the number of possible faults has been reduced by one. Just fixing a fault is quite effective when there are for example just two or three faults remaining. Let the probability that the fault is the causative one be $p_F$, and the probability that it is not the causative one be $q_F$. The expected time to fix the system after fixing the fault is therefore:

$$C_2 = p_F \cdot 0 + q_F(C_F + C_M \log_2(N-1)).$$

This formula can give too much weight to faults which have little chance of being causative. The following formula is preferred, to take account of the possibility that a fault may have little chance of being the causative fault:

$$C_2 = p_F \cdot 0 + q_F(C_F + C_M \log_2(N - N p_F)).$$

The diagnostic progress is therefore:

$$C_{FIX}(N) - C_2 = C_F + C_M \log_2 N - q_F(C_F + C_M \log_2(N - N p_F))$$

Rearranging to:

$$C_{FIX}(N) - C_2 = p_F C_F + C_M(p_F \log_2 N - q_F \log_2 q_F).$$

The diagnostic progress of the fault fix is therefore calculated, and its benefit and value calculated in the same terms as that of a symptom investigation.

The previous calculations require a reliable estimate for the number of faults remaining. This is not immediately obvious, as all faults are always potential candidates, and they are given varying degrees of probability, depending on their scores. Therefore, an estimate of the number of likely faults is made.

Let there be M faults in total, but the population of likely faults be N. Consider the case where there are N equally likely faults, and M−N faults with zero probability. If the faults are ranked in order of likelihood, and the centroid, C, of the faults calculated. The centroid for the N faults would be C=(N+1)/2, thus N=2C−1. The centroid can be calculated for all fault distributions, and gives a measure of the remaining number:

$$C = \sum_{r=1}^{M} rp_r$$

This method can be seen to give a good estimate of the value where there is a population of N equally likely faults. It also gives a good result when the faults form a triangular distribution as in the table below, where there are 5 faults, and the probabilities form a triangular distribution.

|  | r | | | | |
|---|---|---|---|---|---|
|  | 1 | 2 | 3 | 4 | 5 |
| pr | 0.4 | 0.3 | 0.2 | 0.1 | 0 |
| r.pr | 0.4 | 0.6 | 0.6 | 0.4 | 0 |

Using values from the table, C=0.4+0.6+0.6+0.4≧2, and N=2C−1≧3.

Components of a system can fail from two distinct mechanisms. Firstly, hey wear out, and secondly, they can fail due to external damage.

When components fail due to wear and tear, the components with the lowest Mean Time Before Failure (MTBF) will fail more often than those with a high MTBF. When components fail due to damage, the components can fail with equal likelihood.

Accordingly, the fault diagnosis system can store the MTBF values for all faults. Under "Wear and Tear" normalisation mode, the MTBF is used to qualify the probability. (The perceived probability is multiplied by the number of expected faults in 100,000 hours.) Under "Damage" normalisation mode, the MTBF is not taken into consideration.

This has been applied to the previous example, and MTBF figures have been applied. In this case, the more common fault, F3, is seen to be more likely under "Wear and Tear" normalisation, even though it is less likely under "Damage" normalisation.

| Fault | MTBF (hours) | Score = s | Perceived probability = $e^{20s}$ | Normalised probability (Damage) | Perceived probability * 100000/MTBF | Normalised probability (Wear and Tear) |
|---|---|---|---|---|---|---|
| F1 | 30,000 | 0.1 | 7.4 | 0.000 | 246.6667 | 0.000 |
| F2 | 500,000 | 0.6 | 162754.8 | 0.731 | 325509.6 | 0.214 |
| F3 | 50,000 | 0.55 | 59874.1 | 0.269 | 1197482 | 0.786 |
| F4 | 100,000 | −0.1 | 0.1 | 0.000 | 1 | 0.000 |
| Sum | | | 222636.4 | | 1523239 | |

Completely unskilled users of the fault diagnosis system may choose which normalisation strategy to employ. Even skilled personnel may not be able to say whether the cause of a fault was "Damage" or "Wear and Tear". In these cases, an indeterminate strategy is used, where a normalisation between the two is chosen. In this case, the perceived probability is normalised, for example by $\sqrt{1000000/MTBF}$. The effect of this can be seen in the table below, where it is compared with the two previous normalisation strategies.

| Fault | MTBF (hours) | Score = s | Perceived probability = $e^{20s}$ | Normalised probability (Damage) | Normalised probability (Wear and Tear) | Perceived probability * 100000/MTBF | Normalised probability (Indeterminate) |
|---|---|---|---|---|---|---|---|
| F1 | 30,000 | 0.1 | 7.4 | 0.000 | 0.000 | 42.7 | 0.000 |
| F2 | 500,000 | 0.6 | 162754.8 | 0.731 | 0.214 | 230170.0 | 0.462 |
| F3 | 50,000 | 0.55 | 59874.1 | 0.269 | 0.786 | 267765.3 | 0.538 |
| F4 | 100,000 | −0.1 | 0.1 | 0.000 | 0.000 | 0.4 | 0.000 |
| Sum | | | | | | 497989.4 | |

It can be seen that the resultant answer is somewhere between the two, perhaps not quite as good an estimate, when more information is available, but a reasonable answer is provided. Thus, with less knowledge, a less focussed result is obtained. Once extra knowledge is added, the diagnosis becomes more accurate. Such extra knowledge may be input to the fault diagnosis system by a user or maintainer of the monitored system to which the fault diagnosis system is connected as shown in step 118 of FIG. 2. For example, an experienced user of the monitored system may have knowledge which can direct or affect diagnosis in respect of a particular fault. Such user experience may be input via a checkbox on the screen and has the effect of modifying the diagnosis.

A problem can arise when many faults in an area have similar symptom sets that differed in obvious detail; in other words a diagnosis can be accurate to the general area, but give insignificant score differences between faults that differ significantly in detail. The fault diagnosis system is able to "focus" on the area of interest, and consider only the important symptoms.

Faults which have a negative score are extremely unlikely to be candidates for a fault to match the symptom presented. They have more symptoms which do not match the pattern presented than which do. Therefore, negative scoring faults can be safely eliminated from the diagnosis. If this is done, then some symptoms will subsequently have no effect on the diagnosis.

They may have "0" for all remaining faults (or in exceptional cases, they may have "1" for all remaining faults). Such symptoms are not benefiting the diagnosis and can also be eliminated. The elimination of negatively scoring faults, and subsequent elimination of symptoms that have no effect, is termed cropping. Afterwards, the diagnosis is much improved, because the fault diagnosis system is operationally "concentrating" upon the part of the diagnosis which is relevant, and is not being skewed by irrelevant information.

In the fault diagnosis system, automatic cropping can optionally be selected. If cropping is used, the process of diagnosis is extended. Every time a diagnosis is requested, an initial diagnosis is performed, then cropping is done, and then another diagnosis. The results of the second diagnosis are then presented to the user. Once the next stage of diagnosis has been entered, the system reinstates the entire set of faults and symptoms, so that any changes to the diagnosis caused by symptoms with human intervention will correctly change the course of the diagnosis. The user input of Step 118 is then fed back to Step 102 and the rest of the steps are repeated until the fault has been diagnosed and possibly fixed.

When finding a diagnosis, it is possible that there are multiple faults in the system. This would be evidenced by two dissimilar faults having strong scores of 0.5 to 0.7, but no fault having a score close to 1. The fault diagnosis system may be arranged to eliminate one of the faults from consideration, and to diagnose the system ignoring that fault and its attendant symptoms.

This is done by deleting the fault from the diagnostic information and removing all symptoms which are associated with it (i.e. which have "1" for that fault), and keeping all symptoms which are not associated with it (i.e. which have 0 for that fault). Those that have "*" are a little more involved. If the symptom is non-diagnostic, then it may be associated, so the symptom is removed. If the symptom is diagnostic and the value in the Symptom Vector is "1", then the symptom is removed. If the symptom is diagnostic and the value in the Symptom Vector is "0", then the symptom stays.

When preferring a diagnosis, it is possible that a fault does match the symptoms fairly well, but it has been investigated, and the maintainer knows for certain that the fault is not present. In this case, it would be useful to eliminate the fault from consideration as it may be skewing the diagnosis.

This is done by deleting the fault from the diagnostic information but keeping all symptoms.

Note that when both cropping and eliminating, the faults and symptoms are not deleted from the underlying diagnostic information, as they may be needed for future fault diagnosis. They should be marked as removed. Cropping the diagnosis is less permanent than eliminating a fault/symptom from the diagnosis, so the two cases are handled by different mechanisms.

Figure 3:
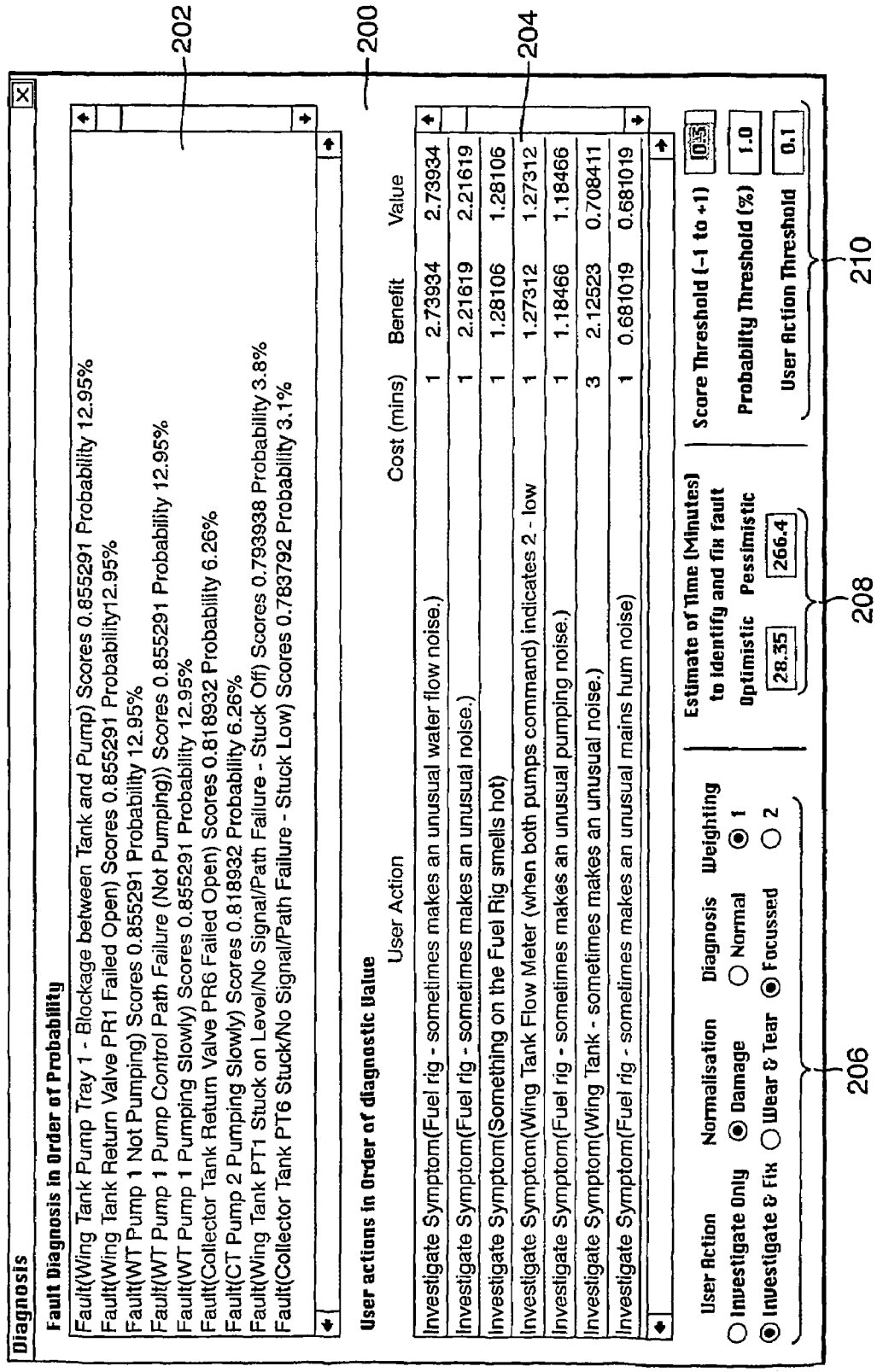
Figure 4:
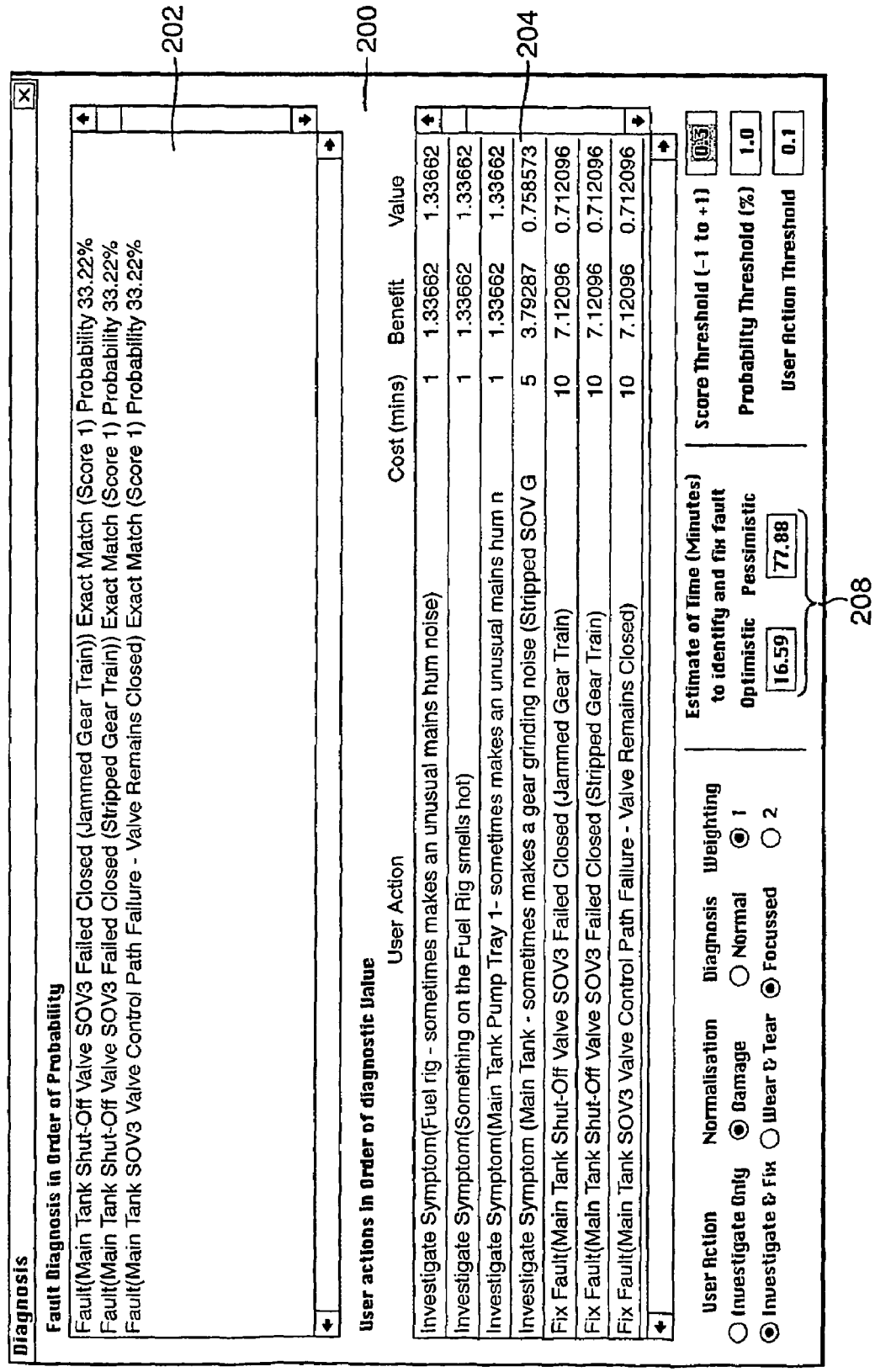

FIGS. 3 to 5 illustrate exemplary graphical user interfaces provided by the fault diagnosis system in one embodiment of the invention, during a fault diagnosis. The user interfaces may for example be provided on a touch-screen display or suchlike.

Referring to FIG. 3, the interface 200 includes a ranked list 202 of possible faults placed in order of calculated probability, after a first pass diagnosis. The interface 200 also includes a ranked list 204 of user actions, including possible manual symptom investigations and/or fault fixes, placed in order of value in the process, which is calculated from the diagnostic benefit and the time cost of the action, both of which are also listed for reference by the maintainer. The interface 200 also includes a set of mode options, including user action mode (investigate only, investigate and fix), normalisation mode (damage, wear and tear), diagnosis mode (normal, focussed), and weighting mode (score weighting 1, score weighting 2). The interface 200 also includes estimates of the time remaining until completion of the diagnosis 208, calculated using an "optimistic" algorithm, and a "pessimistic" algorithm, and various thresholds 210 which may be set by the user to specify the operation of the fault diagnosis system.

Referring to FIG. 4, the ranked list 202 of possible faults placed in order of calculated probability, after a subsequent (third, fourth, etc.) pass diagnosis, has been reduced to three faults of equal probability. The ranked list 204 of user actions, now includes different and differently ordered possible manual symptom investigations and three optional fault fixes, placed in lower order of value in the process due to the relatively long time the fault fixes are estimated to take in relation to the time taken for the most prominent symptom investigations. Note the calculated estimates of time 208 have been reduced significantly.

Referring to FIG. 5, the ranked list 202 of possible faults, after a subsequent (third, fourth, etc.) pass diagnosis, has now been reduced to a single fault. The ranked list 204 of user actions now includes only a single fault fix. Hence, the fault has been diagnosed.

The invention described provides a fault diagnosis system that is capable of quickly and relatively simply diagnosing faults from symptoms generated in complex systems, devices and networks such as satellite telecommunications networks. Furthermore, the fault diagnosis system described is not limited to use in telecommunications networks. The fault diagnosis system may be used in relation to any complex equipment requiring fault diagnosis, including but not limited to both civil and military aircraft, any military system of any significant size (including tanks, other land vehicles, weapon systems, aircraft systems, avionics systems, communications systems, data dissemination systems, ship systems, control systems) and various civilian applications such as power distribution systems, communications systems, air traffic control systems.

Note that in the above examples, only relatively small numbers of faults and symptoms are used to explain the operation of the fault diagnosis system. In a real example of a fault diagnosis system for a complex system, the number of faults and symptoms would be significantly larger; typically at least one hundred or more, and in more complex systems, a thousand or more, faults would be involved, and one hundred or more, and in more complex systems, a thousand or more symptoms would be involved. However, the same algorithms as described above would be applicable.

Note that in the above examples, the Diagnostic Exemplar is constructed, and the Symptom Vector multiplies the Diagnostic Exemplar, such that the contributions made by a fault symptom being present in the current state symptoms and being deemed indicative of a known fault, or being present and being deemed unrelated to a known fault, provide a positive and negative contribution respectively to the score and probability calculated for the corresponding fault. However, in alternative embodiments, the Diagnostic Exemplar is constructed such that contributions may both be positive, or both be negative, with one being more positive and the other being more negative, respectively. The same applies to relationships between the other types of values in the Diagnostic Exemplar, and the results provided by the operation of the Symptom Vector thereon.

Note also that a zero contribution is provided in various of the cases, for example when a symptom is either present in the current state or not present in the current state and non-diagnostic in the diagnostic signatures, or when a symptom is not present in the current state symptoms and deemed indicative of the fault in the corresponding fault exemplar. A zero contribution is more positive than a negative contribution, and more negative than a positive contribution. Alternatively, these various cases may also be arranged to provide non-zero contributions which are similar and/or substantially neutral in effect on the score and probability calculated for the corresponding fault.

The fault diagnosis system of the present invention also includes additional features which provide further benefits. For example, it may be possible to 'associate' similar symptoms, such as those associated with noise or temperature, which relate to one or more faults.

Moreover, it may be possible to modify other parts of a system when a particular fault is being fixed. For example, when an engine is taken out for repair, other associated components, such as the starter motor, gearbox or clutch, could be the subject of a precautionary check to ensure that all is in order prior to replacing the engine. This lessens the likelihood of having to remove the engine again within a short period to fix one of the associated components.

External data may be input into the fault diagnosis system, for example, Failure Modes, Effects and Criticality Analysis (FMECA) data in accordance with the Ministry of Defence Standard DEF-STAN0060.

In FIGS. 3 to 5, the cost to investigate a symptom is given in minutes. However, it will readily be appreciated that any other suitable cost function could be used, for example, the cost given could be the actual cost in relation to the time to investigate the symptom or fix the fault. Furthermore, the user may define the parameters which are used as a method of determining the most efficient or cost-effective way of investigating the symptom or fixing the fault. The user may include a weighting factor in the defined parameters.

The fault diagnosis system may also include data relating to rate of change of symptoms, known generally as 'trend analysis'. The fault diagnosis system may, in addition, include a process for feeding data generated back into the system as a reference for future use.

Data relating to the ageing of symptoms may also be incorporated into the fault diagnosis system. For example, if a symptom exists for a long time, it may not be important and therefore can be discounted. If a symptom exists and has not been checked for a long time, it too may be unimportant and can be discounted. However, such a symptom may become more relevant and needs to be checked.

Although the present invention has been described as performing substantially single level diagnostics, it will be appreciated that by including multi-level diagnostics, a depth of analysis can be obtained from the fault diagnosis system. For example, if a pilot receives an indication that there is a fault in an engine (top level), he can use the fault diagnosis system to drill down to an appropriate level where he can obtain the necessary detailed information to perform a situational assessment about the engine fault.

The invention has been described with reference to identifying an existing failure in a system being monitored by the fault diagnosis system, but the invention could also include a predicted diagnosis module which predicts possible failure. This could lead to a self-fix system where a fault is predicted and fixed before it occurs.

In addition, an assessment of the impact of a fault on the monitored system could also be implemented. For example, three assessment levels could be given, namely, 'action', 'hold' and 'ignore'. This would allow the user of the system being diagnosed to make decisions concerning the availability of the system for its next mission or sortie.

The data obtained from one or more of these assessment levels could then be used as an input to the predicted diagnosis module or as data being fed back as reference data into the system as mentioned above.

Although the invention has been described with reference to an active system, it could also be used as a diagnostic assessability tool for systems during development. This would provide the ability to recognise and distinguish faults from displayed symptoms during development. In particular, it would be possible to determine if there are sufficient correctly located sensors to achieve satisfactory fault diagnosis and give the flexibility of re-design if required. For example, as a diagnostic assessability tool, the invention could determine if it is possible to distinguish one fault from another if they have substantially the same symptoms and then allow modification of the system prior to its completion.

The above embodiments are to be understood as illustrative examples of the invention. Further embodiments of the invention are envisaged. For example, whilst in the above embodiment the fault diagnosis system is implemented by the use of fault diagnosis software, the fault diagnosis system may also be implemented in hard-coded form, such as in the form of an integrated circuit.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A fault diagnosis system for diagnosing faults in complex equipment, the system including:
    means for storing a set of diagnostic signatures which relates a set of known faults which may occur in the equipment to respective fault symptoms which are deemed indicative of said known faults; and
    means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment,
    wherein said diagnostic signatures relate the set of known faults which may occur in the equipment to respective fault symptoms which are deemed unrelated to said known faults, and
    wherein the system is arranged to calculate the diagnostic data such that a fault symptom being present in said current state symptoms and being deemed indicative of a known fault in said diagnostic signatures provides a more positive contribution to a value indicative of likelihood of the corresponding fault being causative, than a different fault symptom being present in said current state symptoms and being deemed unrelated to the fault in said diagnostic signatures.

2. A fault diagnosis system according to claim 1, wherein the system is connected to receive current state symptoms input by a human operator.

3. A fault diagnosis system according to claim 2, wherein the system is arranged to calculate values indicative of diagnostic rejection power for different possible symptoms to suggest a current state symptom which is to he input by a human operator in order to improve the diagnosis.

4. A fault diagnosis system according to claim 3, wherein the system uses said calculated values indicative of likelihood in calculating said values indicative of diagnostic rejection power.

5. A fault diagnosis system according to claim 1, wherein the system is arranged to store mean time before failure values for equipment components, and wherein the system calculates said values indicative of likelihood using said mean time before failure values.

6. A fault diagnosis system according to claim 5, wherein in a first diagnostic mode said probabilities are calculated using a first relationship with said mean time before failure values and in a second diagnostic mode said probabilities are calculated using a second relationship with said mean time before failure values.

7. A fault diagnosis system according to claim 6, wherein in said second diagnostic mode said values indicative of likelihood are calculated without reference to said mean time before failure values.

8. A fault diagnosis system according to claim 1, wherein the values indicative of likelihood are calculated using a weighting function applied to a set of calculated values to produce the said values indicative of likelihood.

9. A fault diagnosis system according to claim 8, wherein said weighting function is a monotonic function.

10. A fault diagnosis system according to claim 9, wherein said weighting function is an exponential function.

11. A fault diagnosis system according to claim 1, wherein said diagnostic signatures relate the set of known faults which may occur in the equipment to respective fault symptoms which are non-diagnostic in relation to said known faults.

12. A fault diagnosis system according to claim 11, wherein the diagnostic signatures identity a fault symptom to be non-diagnostic in relation to a first known fault, and to be indicative of a second known fault.

13. A fault diagnosis system according to claim 11, wherein the system is arranged to calculate the diagnostic data such that a fault symptom being present in said current state symptoms and being deemed non-diagnostic in relation to a known fault in said diagnostic signatures provides a contribution to a value indicative of likelihood of the corresponding fault being causative, which is substantially equal to a contribution provided to said value by a different fault symptom not being present in said current state symptoms and being deemed non-diagnostic in relation to the fault in said diagnostic signatures.

14. A fault diagnosis system according to claim 1, wherein the system is arranged to calculate the diagnostic data such that a fault symptom, which is deemed indicative of a first number of known faults in said diagnostic signatures, being present in said current state symptoms and being deemed indicative of a known fault in said diagnostic signatures provides a less positive contribution to a value indicative of likelihood of the corresponding fault being causative, than the contribution to the same value provided by a different fault symptom, which is deemed indicative of a second number of known faults in said diagnostic signatures, being present in said current state symptoms and being deemed indicative of the same fault in said diagnostic signatures, wherein said first number of known faults is high compared to said second number of known faults and said second number of known faults is low compared to said first number of known faults.

15. A fault diagnosis system according to claim 14, wherein the system is arranged to calculate the diagnostic data such that a fault symptom being present in said current state symptoms and being deemed indicative of a known fault in said diagnostic signatures, provides a contribution to a value indicative of likelihood for the corresponding fault which is normalized relative to the number of known faults of which the fault symptom is deemed indicative of said diagnostic signatures.

16. A fault diagnosis system according to claim 1, wherein the system is arranged to calculate the diagnostic data such that a fault symptom being present in said current state symptoms and being deemed unrelated to a known fault in said diagnostic signatures provides a cumulative negative contribution to a value indicative of likelihood of the corresponding fault being causative.

17. A fault diagnosis system according to claim 16, wherein the system is arranged to calculate the diagnostic data such that a fault symptom being present in said current state symptoms and being deemed indicative of a known fault in said diagnostic signatures provides a more positive contribution to a value indicative of likelihood of the corresponding fault being causative, than a different fault symptom not being present in said current state symptoms and being deemed unrelated to the fault in said diagnostic signatures.

18. A fault diagnosis system according to claim 1, wherein the system is arranged to calculate the diagnostic data such that a fault symptom, which is deemed unrelated to a first number of known faults in said diagnostic signatures, being present in said current state symptoms and being deemed unrelated to a known fault in said diagnostic signatures provides a less negative contribution to a value indicative of likelihood of the corresponding fault being causative, than the contribution to the same value provided by a different fault symptom, which is deemed unrelated to a second number of known faults in said diagnostic signatures, being present in said current state symptoms and being deemed unrelated to the same fault in said diagnostic signatures, wherein said first number of known faults is high compared to said second number of known faults and said second number of known faults is low compared to said first number of known faults.

19. A fault diagnosis system according to claim 18, wherein the system is arranged to calculate the diagnostic data such that a fault symptom being present in said current state symptoms and being deemed unrelated to a known fault in said diagnostic signatures, provides a contribution to a value indicative of likelihood for the corresponding fault which is normalized relative to the number of known faults of which the fault symptom is deemed unrelated said diagnostic signatures.

20. A fault diagnosis system according to claim 1, wherein the system is arranged to calculate the diagnostic data such that a fault symptom being present in said current state symptoms and being deemed indicative of a known fault in said diagnostic signatures provides a cumulative positive contribution to a value indicative of likelihood of the corresponding fault being causative.

21. A fault diagnosis system according to claim 1, wherein the system is arranged to calculate the diagnostic data such that a fault symptom being present in said current state symptoms and being deemed indicative of a known fault in said diagnostic signatures provides a more positive contribution to a value indicative of likelihood of the corresponding fault being causative, than the fault symptom not being present in said current state symptoms.

22. A fault diagnosis system according to claim 1, wherein the system is arranged to calculate values indicative of the probabilities of different possible fault fixes to be performed by a human operator curing a fault.

23. A fault diagnosis system according to claim 1, wherein the system is arranged to provide different diagnostic modes in which said probabilities are calculated using different algorithmic methods.

24. A fault diagnosis system according to claim 1, wherein the system is arranged to calculate sets of diagnostic data in relation to sets of fault symptoms identifying current states of the system in iterative steps using continually improved knowledge of the current state of the system at each step.

25. A fault diagnosis system according to claim 1, wherein similar symptoms are associated for ease of diagnosis.

26. A fault diagnosis system for diagnosing faults in complex equipment, the system including:
    means for storing a set of diagnostic signatures which relates a set of known faults which may occur in the equipment to respective fault symptoms which are deemed indicative of said known faults; and
    means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment,
    wherein the values indicative of non-zero likelihood are calculated using normalization across a calculated set of values.

27. A fault diagnosis system according to claim 26, wherein the diagnostic signatures of said faults having the smallest likelihoods of being causative are omitted from said recalculation.

28. A fault diagnosis system for diagnosing faults in complex equipment the system including:
    means for storing a set of diagnostic signatures which relates a set of known faults which may occur in the equipment to respective fault symptoms which are deemed indicative of said known faults; and
    means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment,
    wherein said diagnostic signatures relate the set of known faults which may occur in the equipment to respective fault symptoms which are deemed unrelated to said known faults, and
    wherein the system is arranged to calculate the diagnostic data such that a fault symptom not being present in said current state symptoms and being deemed indicative of a known fault in said diagnostic signatures provides a more positive contribution to a value indicative of likelihood of the corresponding fault being causative, than a different fault symptom being present in said current state symptoms and being deemed unrelated to the fault in said diagnostic signatures.

29. A fault diagnosis system for diagnosing faults in complex equipment, the system including:
    means for storing a set of diagnostic signatures which relates a set of known faults which may occur in the equipment to respective fault symptoms which are deemed indicative of said known faults; and means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment, wherein said diagnostic signatures relate the set of known faults which may occur in the equipment to respective fault symptoms which are deemed unrelated to said known faults, and wherein the system is arranged such that a fault symptom which is deemed unrelated to a known fault has a more positive contribution to a value indicative of likelihood for the fault, when the symptom is not present in said current state symptoms, than the contribution of the same symptom, when present in said current state symptoms, to a value indicative of likelihood for the same fault probability.

30. A fault diagnosis system for diagnosing faults in complex equipment, the system including:

means for storing a set of diagnostic signatures which relates a set of known faults which may occur in the equipment to respective fault symptoms which are deemed indicative of said known faults; and means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment, wherein the system is connected to receive an indication of a fault fix input by a human operator and to recalculate said diagnostic data in response thereto.

31. A fault diagnosis system for diagnosing faults in complex equipment, the system including:

means for storing a set of diagnostic signatures which relates a set of known faults which may occur in the equipment to respective fault symptoms which are deemed indicative of said known faults; and means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment, wherein said means for processing includes means for calculating the diagnostic data by calculating a first set of values indicative of likelihood, means for identifying faults which have the smallest likelihoods of being causative, and means for performing a recalculation of said diagnostic data whilst taking said faults having the smallest likelihoods of being causative to have an effectively zero likelihood of being causative.

32. A computer readable medium encoded with a computer program to provide a fault diagnosis system for diagnosing faults in complex equipment, the computer program including:

means for storing a set of diagnostic signatures which relates a set of known faults which may occur in the equipment to respective fault symptoms which are deemed indicative of said known faults; and means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment, wherein said diagnostic signatures relate the set of known faults which may occur in the equipment to respective fault symptoms which are deemed unrelated to said known faults, and wherein the system is arranged to calculate the diagnostic data such that a fault symptom being present in said current state symptoms and being deemed indicative of a known fault in said diagnostic signatures provides a more positive contribution to a value indicative of likelihood of the corresponding fault being causative, than a different fault symptom being present in said current state symptoms and being deemed unrelated to the fault in said diagnostic signatures.

33. A computer-implemented method for diagnosing faults in complex equipment, the method comprising:

storing a set of diagnostic signatures which relates a set of known faults which may occur in the equipment to respective fault symptoms which are deemed indicative of said known faults:

processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment; and communicating the calculated diagnostic data to a human operator, wherein the system is connected to receive an indication of a fault fix input by the human operator, and to recalculate said diagnostic data in response thereto.

34. A computer-implemented method for diagnosing faults in complex equipment, the method comprising:

storing a set of diagnostic signatures which relates a set of known faults which may occur in the equipment to respective fault symptoms which are deemed indicative of said known faults;

processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment wherein the values indicative of non-zero likelihood are calculated using normalization across a calculated set of values; and storing the calculated diagnostic data.

35. A computer-implemented method for diagnosing faults in complex equipment, the method comprising:

storing a set of diagnostic signatures which relates a set of known faults which may occur in the equipment to respective fault symptoms which are deemed indicative of said known faults;

processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment, wherein said processing step includes calculating the diagnostic data by calculating a first set of values indicative of likelihood, identifying faults which have the smallest likelihoods of being causative, and performing a recalculation of said diagnostic data whilst taking said faults having relatively small likelihoods of being causative to have an effectively zero likelihood of being causative; and storing the calculated diagnostic data.

36. A fault diagnosis system for diagnosing faults in complex equipment, the system including:

means for storing a set of diagnostic signatures which relates a set of known faults which may occur in the equipment to respective fault symptoms which are deemed indicative of said known faults; and means for processing said diagnostic signatures and a set of fault symptoms identified for a current state of the equipment, to calculate diagnostic data for identifying a fault causing the current state of the equipment, the diagnostic data including a plurality of values which are indicative of different relative non-zero likelihoods of each of a plurality of different known faults causing the current state of the equipment, wherein the means for storing diagnostic signatures defined three possible states for a fault/symptom pair, namely: the existence of a link; the possible existence of a link; and the certain absence of a link.

* * * * *